(12) United States Patent
Musolino

(10) Patent No.: US 6,244,320 B1
(45) Date of Patent: Jun. 12, 2001

(54) HEATING PLATE WELDING MACHINE WITH MOBILE TABLE

(75) Inventor: François Musolino, Douvaine (FR)

(73) Assignee: Etudes Realisations Techniques et Commerciales, La Roche sur Foron (FR)

(*) Notice: Subject to any disclaimer, the term of this patent is extended or adjusted under 35 U.S.C. 154(b) by 0 days.

(21) Appl. No.: 09/269,469

(22) PCT Filed: Sep. 24, 1997

(86) PCT No.: PCT/FR97/01671

§ 371 Date: Mar. 24, 1999

§ 102(e) Date: Mar. 24, 1999

(87) PCT Pub. No.: WO98/13193

PCT Pub. Date: Apr. 2, 1998

(30) Foreign Application Priority Data

Sep. 25, 1996 (FR) ................................. 96 11980

(51) Int. Cl.$^7$ .............................. B32B 35/00; B29C 65/20
(52) U.S. Cl. .......................................... 156/499; 156/580
(58) Field of Search ............................... 156/228, 304.6, 156/322, 359, 499, 580

(56) References Cited

U.S. PATENT DOCUMENTS

| | | | |
|---|---|---|---|
| 3,175,939 | * | 3/1965 | Hanes et al. . |
| 3,391,045 | * | 7/1968 | Mojonnier et al. . |
| 3,682,748 | * | 8/1972 | Kimball . |
| 3,793,120 | * | 2/1974 | Spadano ............................. 156/499 |
| 4,056,425 | * | 11/1977 | Groby ................................. 156/499 |
| 4,443,288 | * | 4/1984 | Sawada et al. .................. 156/499 X |
| 4,960,478 | | 10/1990 | Newkirk et al. . |
| 4,999,908 | | 3/1991 | Piper et al. . |

FOREIGN PATENT DOCUMENTS

| | | |
|---|---|---|
| 1704263 | 12/1970 | (DE) . |
| 3118009 | 12/1982 | (DE) . |
| 0327265 | 8/1989 | (EP) . |
| 0447932 | 9/1991 | (EP) . |
| 2320839 | 3/1977 | (FR) . |
| 2688736 | 9/1993 | (FR) . |
| 1486842 | 9/1977 | (GB) . |
| 2085354 | 4/1982 | (GB) . |
| 60356 | 4/1970 | (LU) . |
| 95/18714 | 7/1995 | (WO) . |

OTHER PUBLICATIONS

Japanese Patent Abstract No. 56118261, "Patent Abstracts of Japan", vol. 005, #197, Dec. 15, 1981.

Japanese Patent Abstract No. 59180960, "Patent Abstracts of Japan", vol. 009, #039, Feb. 19, 1985.

Japanese Patent Abstract No. 54141867, Database WPI, week 7950 Derwent Publications Ltd., Nov. 5, 1979.

* cited by examiner

Primary Examiner—Curtis Mayes
(74) Attorney, Agent, or Firm—William H. Eilberg

(57) ABSTRACT

The welding machine comprises within a frame (1), a horizontal heating plate (21), a first lower piece-holder (22), a second upper piece-holder (23), means (41) for displacing horizontally the heating plate (21), means (42) for displacing vertically (29) the heating plate (21), and means (26) for displacing vertically the second piece-holder (23). The heating plate (21) and its vertically actuating cylinder (42) constitute an assembly connected to a heating plate carrier (33) by indexing means (27) for adjusting the vertical position of the vertical displacement (29) of the heating plate (21). The first piece-holder (22) is a telescoping table with adjustable height and capable of being locked mounted on the frame (1). Thus the possibilities of adjusting and adapting the welding machine to the different sizes of pieces to be welded are increased.

11 Claims, 6 Drawing Sheets

HEATING PLATE WELDING MACHINE WITH MOBILE TABLE

SUMMARY OF THE INVENTION

The present invention concerns heating plate welding machines, which are generally used to weld together two heat-weldable material parts along respective plane or non-plane connecting surfaces.

In the heating plate welding machines usually employed, such as that described in document FR 2 320 839 A, for example, a frame carries the various functional units of the machine including a heating plate, a first workpiece support device, and a second workpiece support device facing the first workpiece support device. First means move the heating plate along a transverse insertion travel parallel to its plane between a welding position engaged between the first and second workpiece support devices and a loading position withdrawn from the first and second workpiece support devices. Second means move the heating plate along a welding travel perpendicular to its plane between two extreme positions. The first workpiece support device is fixed to the frame. The second workpiece support device is mobile, and can be moved by third means along a contact travel perpendicular to the plane of the heating plate between the extreme positions and toward or away from the first workpiece support device. The machine also includes cylinders for moving the first workpiece support device toward or away from the second workpiece support device.

The movements of the heating plate, along the insertion travel and along the welding travel, are generally linear and driven by cylinders which provide amplitudes of movement limited by the allowed overall size of the cylinders of the machine. Similarly, the second workpiece support device is moved along the contact travel by a cylinder providing a limited amplitude of movement.

In operation, at least one first workpiece to be welded is placed on the first workpiece support, while at least one second workpiece to be welded is fixed to the second workpiece support, dedicated tooling providing the connection between each workpiece support and the corresponding workpiece to be welded. The machine is set up so that during a heating step the first face of the heating plate can be pressed onto the first workpiece to be welded on the first workpiece support, while the second workpiece to be welded is pressed against the opposite face of the heating plate by the second workpiece support. The second workpiece support is then moved away, after which the heating plate is moved away from the first workpiece to be welded carried by the first workpiece support and then withdrawn from the two workpiece supports. The second workpiece support is operated again to press the connecting surfaces of the two workpieces to be welded against each other, the plastics material being sufficiently softened or melted to assure a weld.

Clearly, for each given machine, the various movements that are necessary limit the maximal dimensions of workpieces that can be welded.

Workpieces of different shapes can be welded on the same machine by fitting appropriate dedicated tooling, but setting up the machine is complex because the travels of the cylinders moving the heating plate and the second workpiece support device are affected by the differences in the dimensions of the tooling and the workpieces to be welded.

Accordingly, in document FR 2 320 839 A, the adjustment can be effected by the cylinders moving the first workpiece support. This kind of adjustment is not reliable, however, and no adjustment means are explicitly described, and also this document concerns the welding of storage battery housings, the dimensions of which would appear to be constant.

Document FR 2 688 736 A describes a similar machine, but in which the first workpiece support is fixed, without any adjustment means.

Document GB 2 085 354 A (FIG. 5) describes a similar machine in which the heating plate is suspended vertically from a carriage that is movable to adjust it, and so is not positively held so that it can be moved along a particular welding travel. This means that the weld is not reproducible.

Accordingly, in prior art machines, there are no means for reliably and quickly adjusting the machine to track variations in the size of the workpieces to be welded, and to maintain the pressures exerted during operation of the machine effectively.

SUMMARY OF THE INVENTION

The problem addressed by the present invention is that of designing improvements to machines for welding workpieces using heating plates which, without modifying the overall size of the machine, and using conventional tooling available until now, significantly increase the possible variation in the dimensions of the workpieces that the machine can weld, retaining good reproducibility of the weld.

The improved possibilities of modifying the dimensions of workpieces to be welded must preferably be obtained without complicating the operations of control of the cylinders actuating the mobile parts of the machine, and without increasing the travel itself of the cylinders, so preserving a good speed of the welding cycle.

Accordingly, an improved machine in accordance with the invention must be able to replace a plurality of existing machines each suited to a range of dimensions of the workpieces to be welded.

To achieve the above and other objects, a welding machine in accordance with the invention having a heating plate comprises a frame, a heating plate, a first workpiece support device, a second workpiece support device facing the first workpiece support device, first means for moving the heating plate along an insertion travel parallel to its plane between a welding position engaged between the first and second workpiece support devices and a loading position withdrawn from the first and second workpiece support devices, second means for moving the heating plate along a welding travel perpendicular to its plane between two extreme positions, and third means for moving the second workpiece support device along a contact travel perpendicular to the plane of the heating plate toward and away from the first workpiece support device and between respective bearing and withdrawn positions, together with means for moving the first workpiece support device perpendicular to the heating plate toward or away from the second workpiece support device.

The first workpiece support device further comprises:
an adjustable position table, mounted on the frame, being movable it toward or away from the second workpiece support device, and
means for locking the table in a particular position chosen from a set of predefined positions and to withstand thus pressure forces exerted on the table during operation of the machine.

This means that the workpiece supports and the heating plate are mechanically strong, to guarantee good reproducibility of the weld.

For example, the means for locking the table comprise transverse screws selectively engaged in corresponding holes in respective fixed lateral guide plates of the frame and in guide brackets carried by the table.

Improved possibilities of adjusting the machine can be obtained by further providing indexing means for indexing the welding travel of the heating plate by moving its two extreme positions of welding travel perpendicularly to the plane of the heating plate toward or away from the first workpiece support device.

In one advantageous embodiment, the table comprises a top plate joined to a bottom support by expandable connecting members each including a first arm, one end of which is articulated to the bottom support and the other end of which slides under the top plate, and a second arm, one end of which is articulated under the top plate and the other end of which slides on the bottom support, the two arms being articulated to each other in their central areas, the sliding end of the second arm being slid horizontally on the bottom support by a cylinder to adjust the height of the table.

The design of a machine of the above kind can be adapted to heating plates oriented vertically or horizontally. In a preferred embodiment, the heating plate is oriented in a substantially horizontal position, its insertion travel is substantially horizontal and its welding travel is substantially vertical, the first workpiece support device is in a lower position on the frame, and the second workpiece support device is in an upper position on the frame and its contact travel is substantially vertical.

The means for indexing the welding travel of the heating plate can advantageously be such that:

- the heating plate support carriage comprises at least two vertical lateral flanges each having an indexing opening with a vertical linear main part, one end of which is joined to a plurality of oblique secondary parts diverging from each other in the downward direction and offset from each other in the vertical direction,
- the heating plate support frame comprises transverse horizontal lugs or rods engaging in the indexing openings of the heating plate support carriage, and able to slide in said indexing openings to penetrate selectively into one of the oblique secondary parts and to abut against its bottom.

An advantageous arrangement for reducing the overall size of the welding machine is for the heating plate support carriage to be moved, along its insertion travel, by two horizontal cylinders in the upper part of the frame on respective opposite sides of the interior part of the frame.

With a machine of the above kind with improved adjustment possibilities, it is advantageous for the door providing access to the interior space of the frame to open quickly and wide. To this end, the door may comprise two telescopic lateral flaps.

BRIEF DESCRIPTION OF THE DRAWINGS

Other objects, features and advantages of the present invention will emerge from the following description of specific embodiments, given with reference to the accompanying drawings, in which.

DESCRIPTION OF THE PREFERRED EMBODIMENTS

Figure 1:
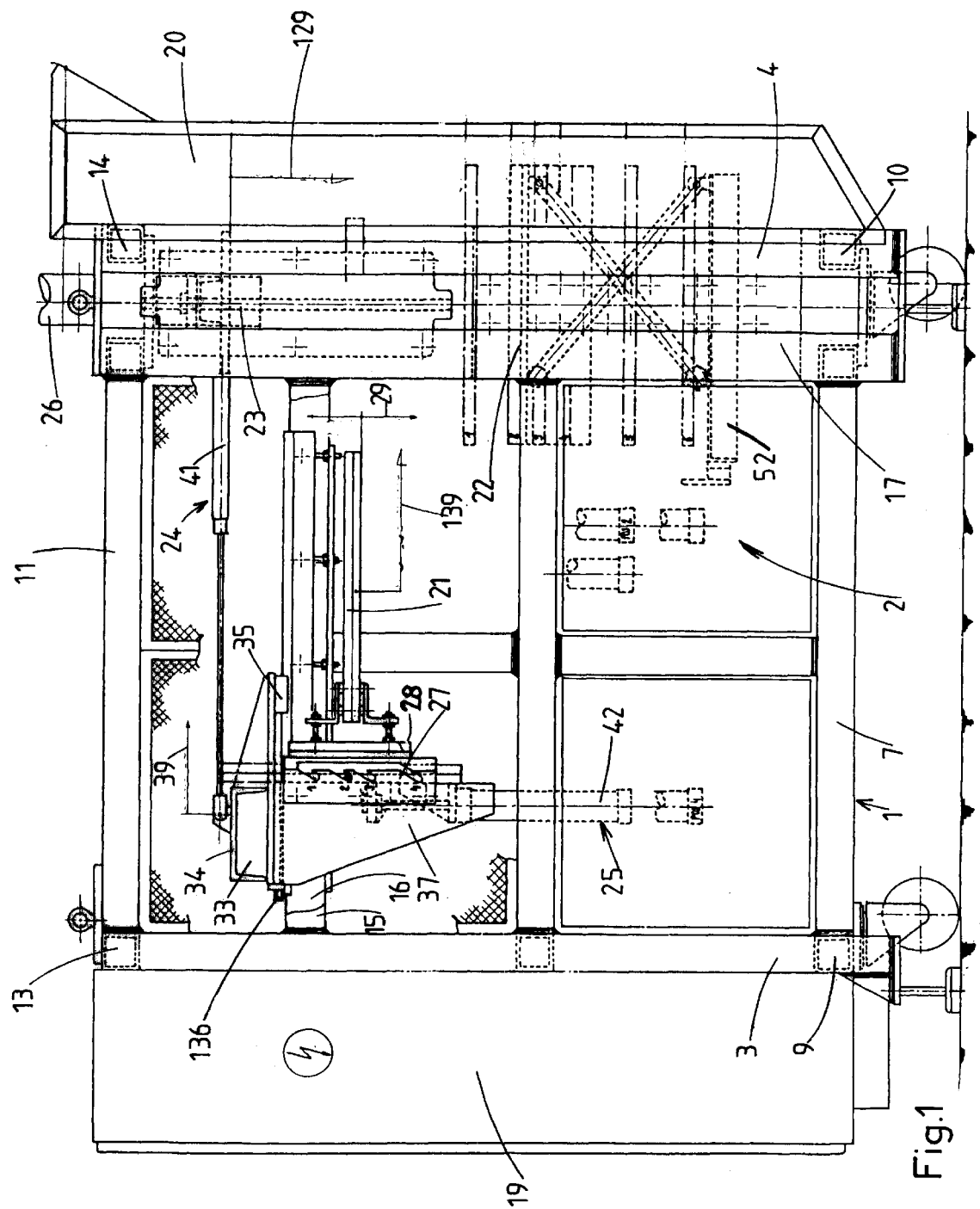
FIG. 1 is a side view of a heating plate welding machine constituting one embodiment of the invention, showing the heating plate in the loading position and the lateral wall of the frame removed.
Figure 2:
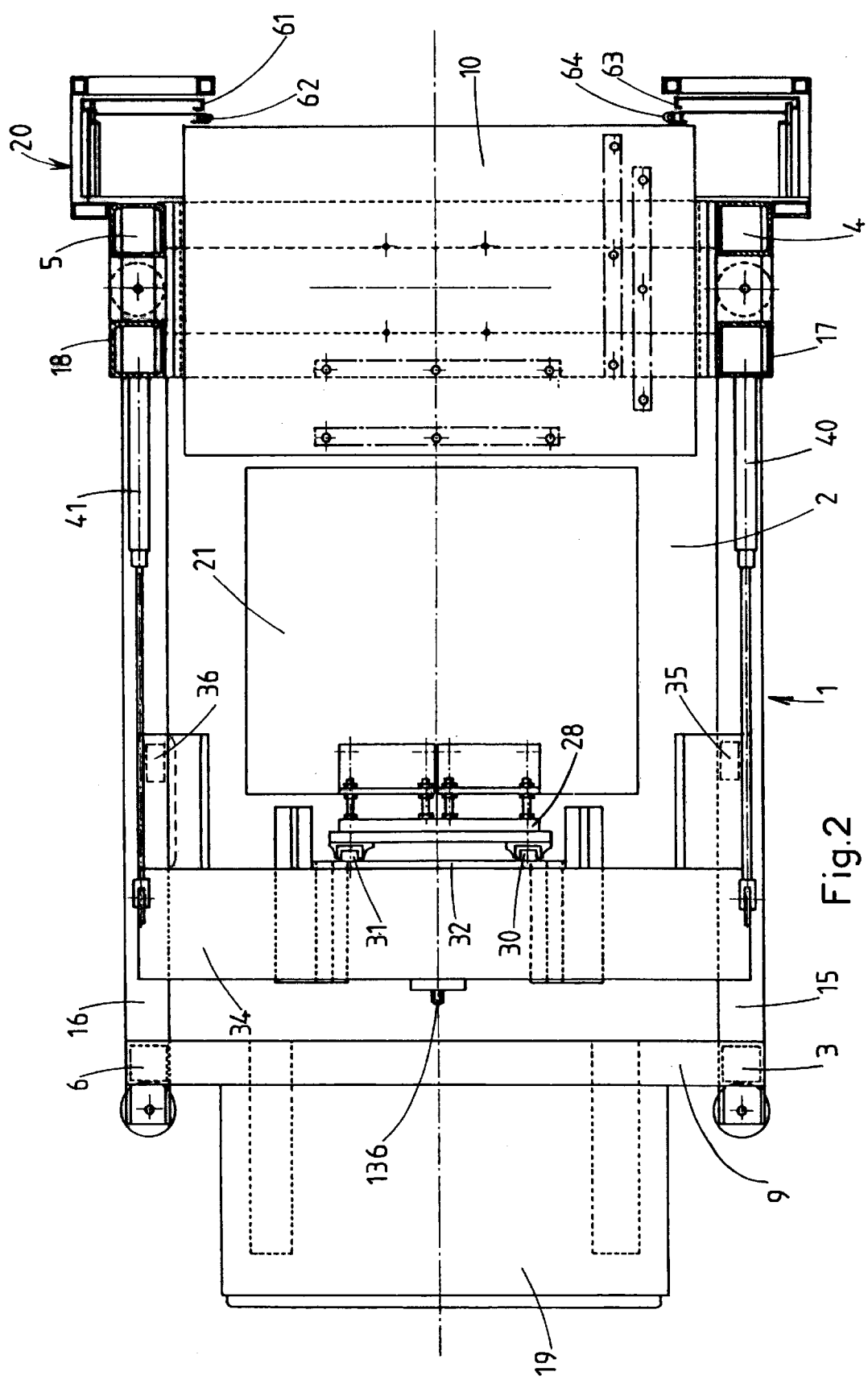
FIG. 2 is a plan view of the welding machine from FIG. 1 showing the door open, the heating plate in the loading position and the top wall removed.
Figure 3:
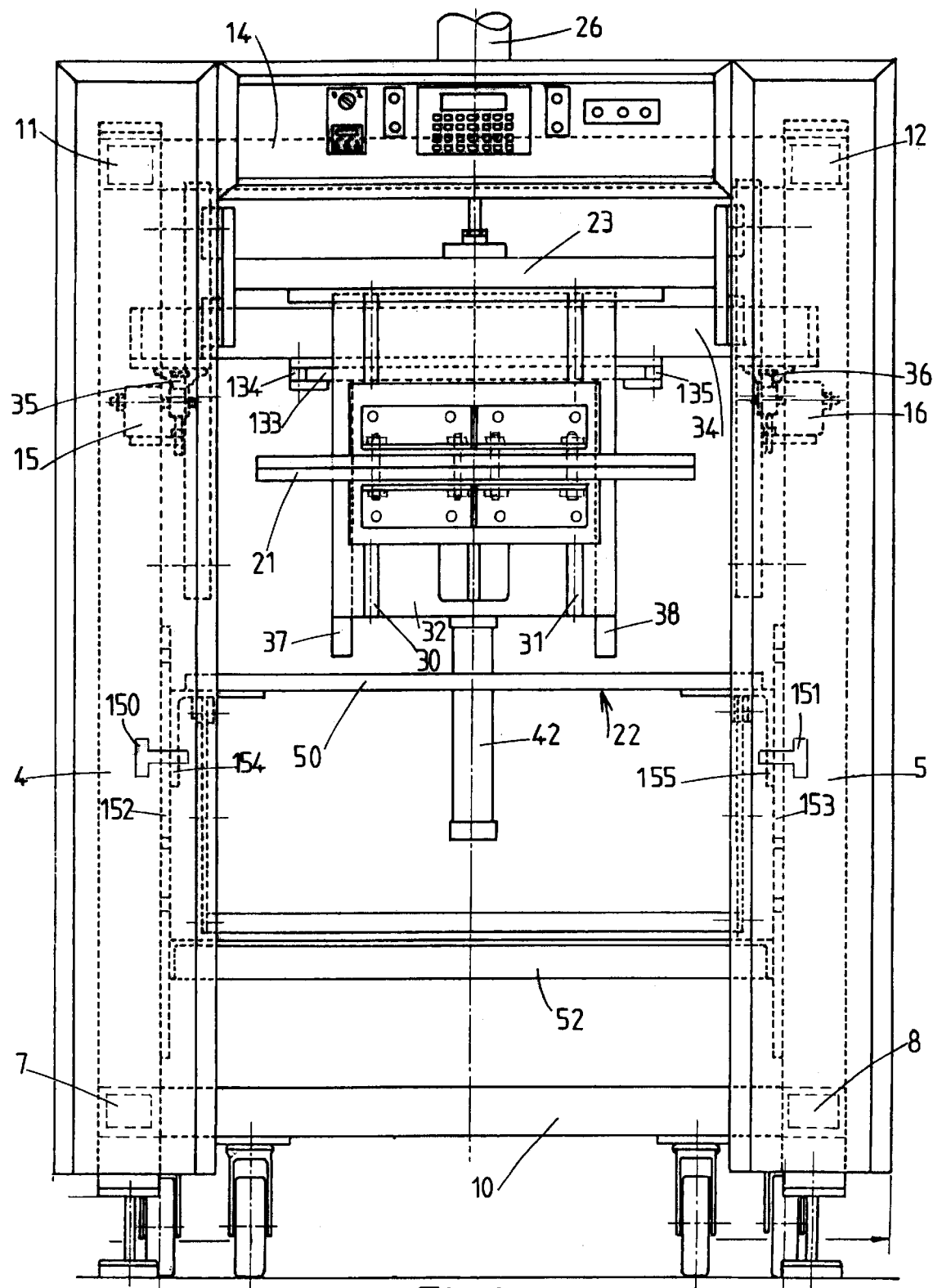
FIG. 3 is a front view of the welding machine from FIG. 1 showing the door open.

In the embodiment shown in the figures, in particular in FIGS. 1 to 3, a welding machine in accordance with the invention comprises a substantially parallelepiped-shape frame 1 defining an interior space 2 containing all of the functional units of the welding machine. The frame 1 comprises a supporting structure defined overall by four vertical uprights 3, 4, 5 and 6 disposed at the four corners of the interior space 2, two bottom longitudinal members 7 and 8, two end bottom crossmembers 9 and 10, and two opposed top longitudinal members 11 and 12 and two end top crossmembers 13 and 14.

In the embodiment shown, there are also two opposed intermediate longitudinal members 15 and 16, substantially three-quarters the height up the frame 1, together with intermediate uprights 17 and 18 near the uprights 4 and 5, respectively.

An electrical equipment cabinet 19, containing switching and control devices, is provided against the rear face of the frame defined by the rear uprights 3 and 6 and the rear crossmembers 9 and 13. A door system 20 is provided against the front face of the frame defined by the front uprights 4 and 5 and the front crossmembers 10 and 14.

The interior space 2 of the frame 1 contains the functional units of the welding machine, including particularly a heating plate 21, a first workpiece support device 22, a second workpiece support device 23 facing the first workpiece support device 22, first means 24 for moving the heating plate 21 along an insertion travel 39 parallel to its plane, second means 25 for moving the heating plate 21 along a welding travel 29 perpendicular to its plane, and third means 26 for moving the second workpiece support device 23 along a contact travel 129 perpendicular to the plane of the heating plate 21. In accordance with the invention, indexing means 27 are further provided for indexing the welding travel 29 of the heating plate 21, by movement of its two extreme positions perpendicularly to the plane of the heating plate 21 toward or away from the first workpiece support device 22.

In the embodiment shown in the figures, the heating plate 21 is substantially horizontally oriented, its insertion travel 39 is substantially horizontal and its welding travel 29 is substantially vertical. The first workpiece support device 22 is in the bottom part of the interior space 2 on the frame 1 and the second workpiece support device 23 is in the top part of the interior space 2 of the frame 1, its contact travel 129 being substantially vertical.

Figure 4:
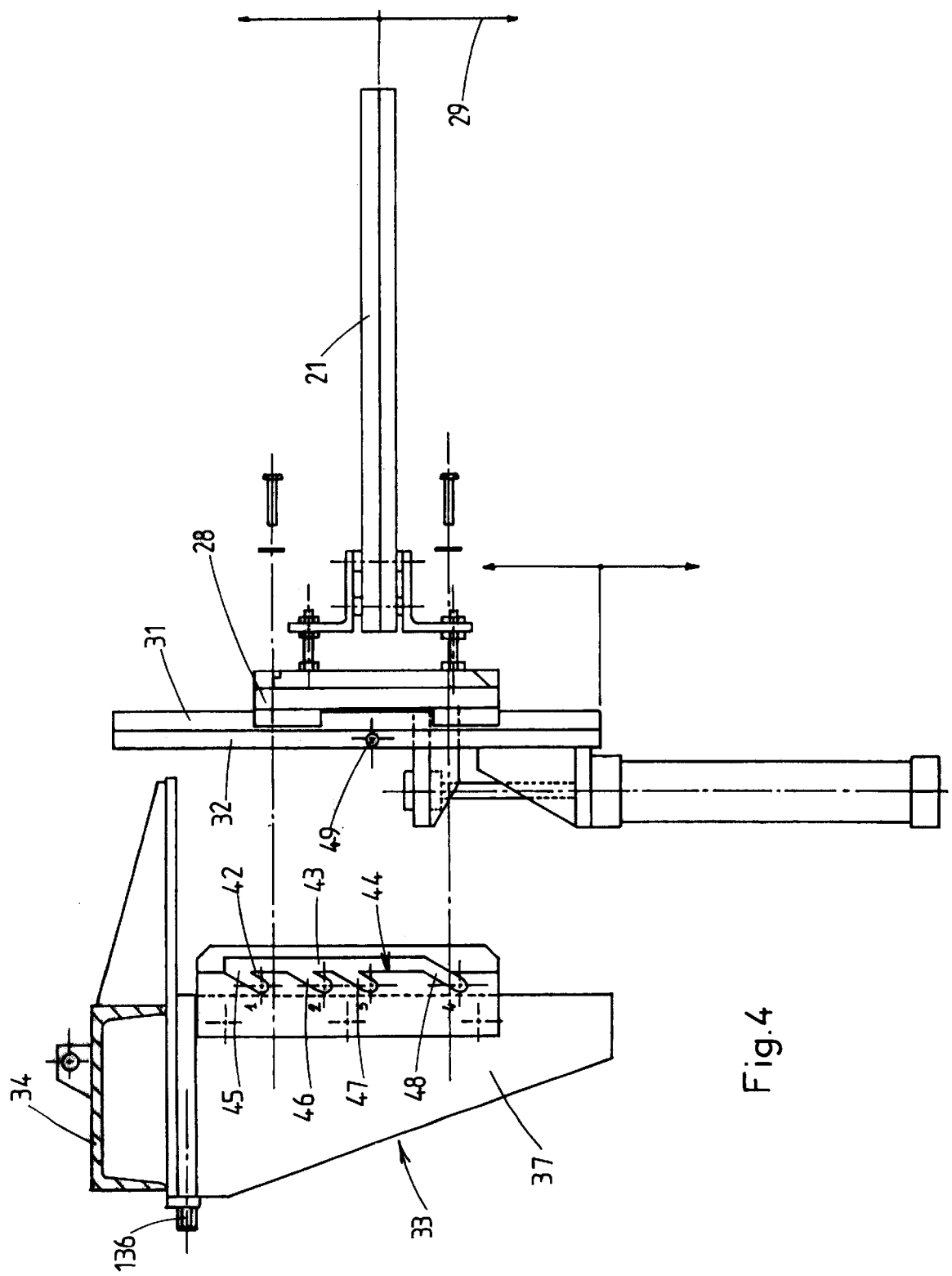
FIG. 4 is a partial side view in section, showing the means for indexing the heating plate support in one embodiment of the present invention.

The heating plate 21 is mounted on a mobile heating plate support bracket 28 in turn movable in vertical translation along said welding travel shown by the arrow 29 in FIGS. 1 and 4, perpendicularly to the plane of the heating plate 21, sliding on vertical guides 30 and 31 of a frame 32 in turn carried by a heating plate support carriage 33.

The heating plate support carriage 33 has a carriage top main crossmember 34 the ends of which have skids 35 and 36 which slide on longitudinal guides carried by the intermediate longitudinal members 15 and 16. The heating plate support carriage 33 also has two vertical side flanges 37 and 38 shaped to retain the frame 32 and joined at their top ends by a horizontal connecting plate 133 retained by the top main crossmember 34. The horizontal connecting plate 133 is preferably mounted to slide longitudinally in the direction of the welding travel 29, its two lateral edges being engaged in lateral slides 134 and 135 fastened to the top main crossmember 34. A rear adjuster screw 136 adjusts the longitudinal position of the flanges 37 and 38 and of the connecting plate 133 relative to the top main crossmember 34, so allowing fine adjustment of the position of the heating plate for the welding step, as shown by the arrow 139.

In executing its insertion longitudinal travel 39 shown in FIG. 1, the heating plate support carriage 33 slides on the longitudinal guides when acted on two horizontal cylinders 40 and 41 in the top part of the frame 1 on respective opposite sides of the interior welding space 2 and coupled to the ends of the top main crossmember 34.

The particular position of the cylinders 40 and 41 actuating the heating plate 21 along the insertion travel 39 produces a compact welding machine that is short in length.

In executing its welding travel 29, the mobile heating plate support bracket 28 slides on the vertical guides 30 and 31 of the frame 32 and is operated on by a vertical cylinder 42 carried by the frame 32 and the travel of which is adjustable.

In accordance with the invention, the position of the first workpiece support device 22 can be adjusted by movement perpendicular to the heating plate 21, in the vertical direction, toward or away from the second workpiece support device 23.

Figure 5:
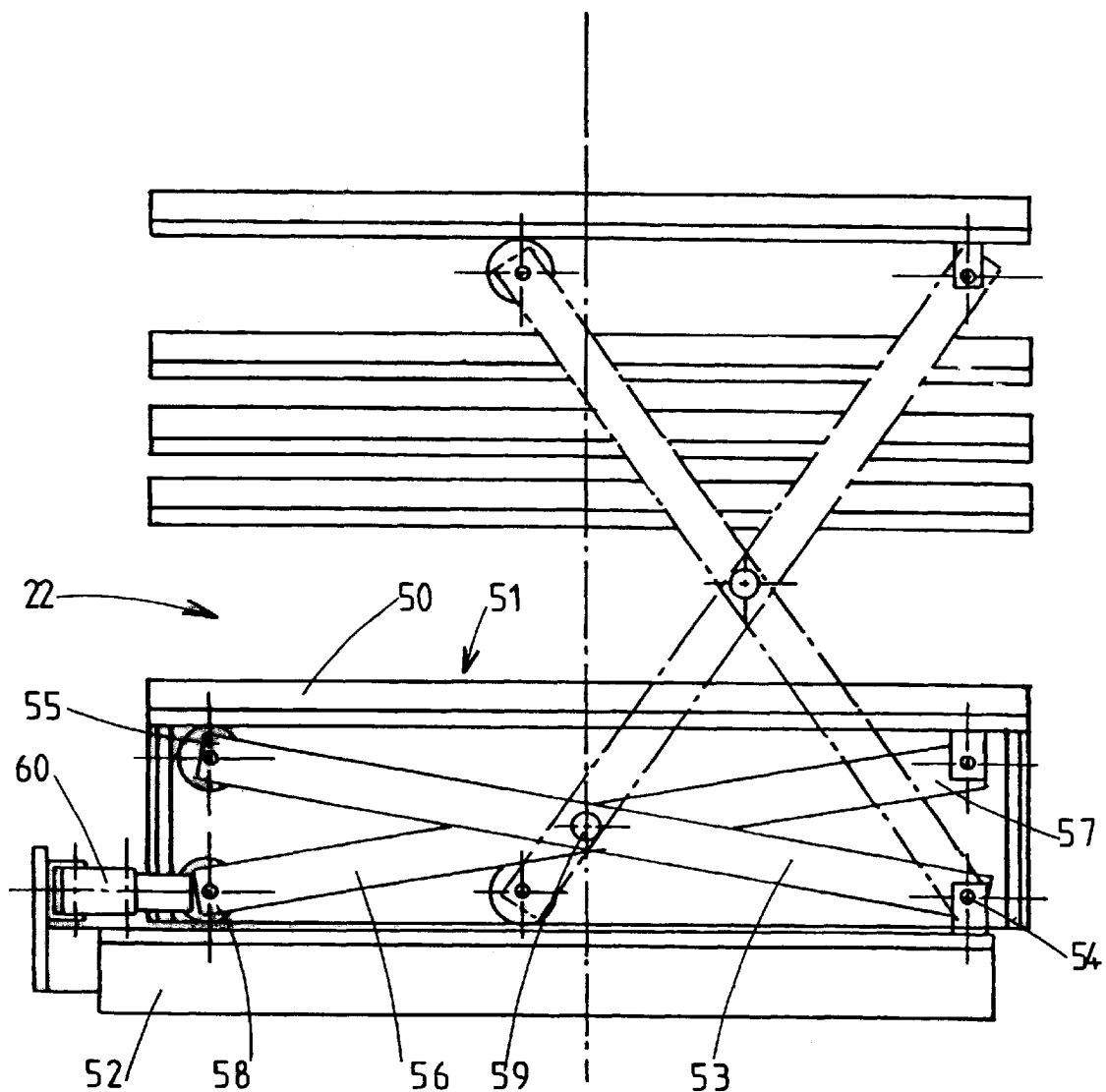
FIG. 5 is a side view showing in detail the construction of a variable height table in one embodiment of the present invention.

To this end, in the embodiment shown in FIGS. 1 and 5, the first workpiece support device 22 can include an adjustable height table 50 mounted on the frame 1, for example.

In the embodiment shown, the table 50 has a top plate 51 connected to a fixed bottom support 52 by expandable connecting members each including: a first arm 53, one end 54 of which is articulated to the bottom support 52 and the other end 55 of which slides under the top plate 51, and a second arm 56, one end 57 of which is articulated under the top plate 51 and the other end 58 of which slides on the bottom support 52. The two arms 53 and 56 are articulated to each other in their central areas 59, and the sliding end 58 of the second arm 56 is slid horizontally on the bottom support 52 by a cylinder 60 to adjust the height of the table 50.

As shown in FIG. 3, the table 50 can be immobilized or locked in a particular position chosen from a set of predefined vertical positions by transverse screws such as the screws 150 and 151 selectively engaged in corresponding holes respectively formed in fixed lateral guide plates 152 and 153 of the frame 1 and in guide brackets 154 and 155 carried by the table 50.

The operation of the welding machine is described hereinafter. In the loading position, shown in FIGS. 1 to 3, the heating plate 21, carrying heating blocks with the same profiles as the respective connecting surfaces of the workpieces to be welded, is in a loading position, withdrawn from the first and second support devices 22 and 23, the second workpiece support device 23 being withdrawn from the first workpiece support device 22. A first workpiece to be welded, held on the first workpiece support device 22 by a first dedicated tooling adapted to the shape of the first workpiece to be welded and shaped to be fixed to the first workpiece support device 22, can then be moved into place. The second workpiece to be welded, fixed to the second workpiece support device 23 by second dedicated tooling adapted to the shape of the second workpiece to be welded and shaped to be fixed to the second workpiece support device 23, can equally be moved into place. The respective connecting surfaces of the two workpieces to be welded are then face-to-face and separated from each other.

The cylinders 40 and 41 move the heating plate 21 along the insertion travel 39 between the two workpieces to be welded, that is to say between the first and second workpiece support devices 22 and 23, in the sufficient gap that must exist between the two connecting faces of the workpieces to be welded. The cylinder 42 lowers the heating plate 21 along the welding travel 29 until the bottom face of its lower heating block is pressed against the connecting face of the first workpiece to be welded fixed to the first workpiece support device 22, the heating plate 21 then bearing against abutments carried by the tooling of the first workpiece support device 22. The cylinder 26 lowers the second workpiece support device 23 along the contact travel 129 so that the connecting face of the second workpiece to be welded that it carries is pressed against the top face of the top heating block of the heating plate 21, abutments carried by the tooling of the second workpiece support device 23 bearing against the heating plate 21. The heating plate 21, which is maintained at an appropriate temperature by electrical heating elements connected to an external electrical power supply, heats the two connecting faces of the workpieces to be welded and partially melts their surfaces.

The cylinder 26 then raises the second workpiece support 23 after which the successive operation of the cylinder 42 and of the pair of cylinders 40 and 41 raises the heating plate 21 and then moves it to the loading position withdrawn from the first and second workpiece support devices 22 and 23, after which the cylinder 26 lowers back the second workpiece support device 23 until the two connecting faces of the workpieces to be welded are pressed together. The two workpieces to be welded are pressed together for long enough to effect the weld, and finally the second workpiece support device 23 is raised and the two workpieces that have been welded together are removed.

The invention enables the position of the first workpiece support device 22 to be adapted to the respective size of the two workpieces to be welded reliably, quickly and at low cost. To this end, depending on the workpieces to be welded, the first workpiece support device 22 is positioned at an appropriate vertical position, by actuating the cylinder 60. Movement of the first workpiece support device 22 is thereafter prevented by inserting the transverse screws 150 and 151 in the corresponding holes in the plates 152 and 153 and the brackets 154 and 155.

Accordingly, without increasing the welding travel 29 of the heating plate 21, the total relative vertical area that the heating plate 21 can reach is increased in size, which increases the range of different sizes of workpieces that can be welded.

Figure 6:
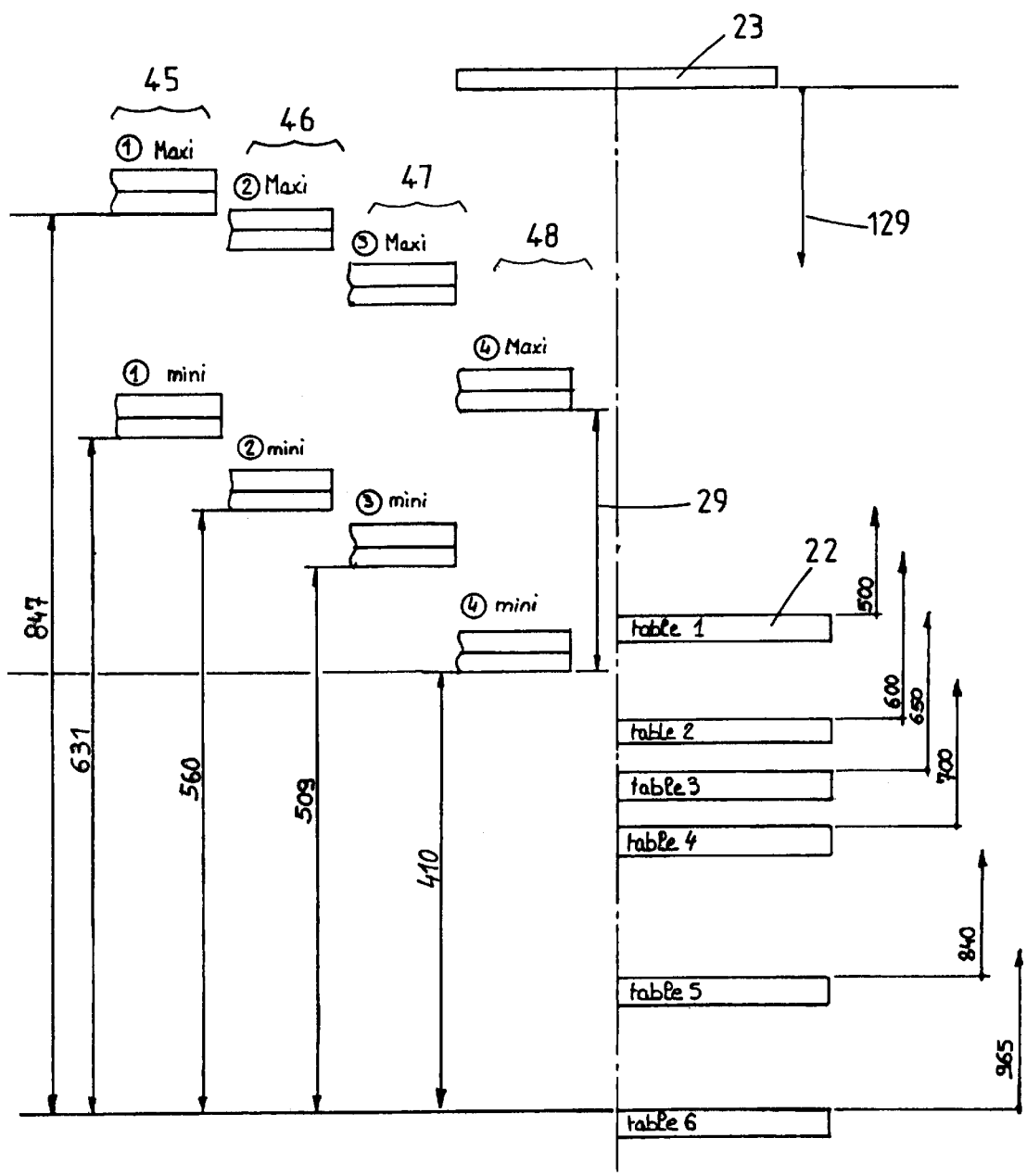
FIG. 6 shows the possibilities of adjusting the welding machine from FIG. 1.

FIG. 6 shows this first possibility of adaptation in accordance with the invention. The righthand part of the figure shows several possible positions of the first workpiece support device 22, to which it is moved by the cylinder 60. Clearly the bottom position is suitable when the first workpiece to be welded is high and the second workpiece to be welded is relatively low. Conversely, the upper position is suitable when the first workpiece to be welded has a lower height and the second workpiece to be welded has a greater relative height.

The combination of the frame 32, the heating plate support bracket 28 and the cylinder 42 can additionally or instead be moved vertically in its entirety by the indexing means 27 to execute an indexing movement between a plurality of distinct positions on the heating plate support carriage 33. This indexing movement simultaneously moves both extreme positions of the welding travel 29 of the heating plate 21. In this way the position of the extreme positions of the welding travel 29 can be chosen in the interior space 2, allowing adaptation to the size of the workpieces to be welded.

In the embodiment shown in the figures, and in particular in FIG. 4, the indexing means 27 for indexing the welding travel 29 of the heating plate 21 comprise means for selectively fixing the frame 32 to the heating plate support carriage 33 in a plurality of positions offset from each other in the vertical direction perpendicular to the heating plate 21.

In practice, the heating plate support carriage 33 comprises at least two vertical side flanges 37 and 38 each of which has an indexing opening such as the opening 42. The opening 42 has a vertical linear main part 43, a vertical edge 44 of which is joined to a plurality of oblique secondary parts 45, 46, 47 and 48 diverging in the downward direction, offset from each other in the vertical direction, as shown, and having bottoms aligned with a common vertical axis.

The frame 32 has horizontal lugs or rods 49, oriented transversely and shaped to engage in the indexing openings such as the opening 42 of the heating plate support carriage 33 and to slide in said indexing openings 42 to penetrate selectively into one of the oblique secondary parts 45 through 48 and to abut against the bottom of said chosen oblique secondary part 45 to 48. Corresponding faces of the heating plate support carriage 33 and of the frame 32 form bearing surfaces opposing tilting of the armature, for holding the heating plate 21 in a fixed horizontal position relative to the heating plate support carriage 33.

The lefthand part of FIG. 6 shows the additional possibilities of vertical adjustment provided by the indexing means 27. Clearly the welding travel 29 can be moved vertically and the possibilities of adapting the position of the heating plate 21 relative to the first workpiece support device 22 according to the sizes of the workpieces to be welded can be increased.

The additional possibilities for adjusting the relative heightwise positions of the functional units of the welding machine lead to the provision of a door system 20 that is well adapted to such possibilities. A door with two telescopic lateral flaps that retract laterally is preferably employed, as shown in FIG. 2: the door, which is shown in the open position in the figure, has a first telescopic lateral flap formed of a first panel 61 and a second panel 62 sliding laterally relative to each other and relative to the frame 1. Similarly, a telescopic second lateral flap comprises a first panel 63 and a second panel 64 sliding laterally relative to each other and relative to the frame 1. This provides a door that is of compact overall size in the open position, and that can be closed and opened very quickly during the operating cycle.

The present invention is not limited to the embodiments explicitly described, but includes variants and generalizations thereof within the scope of the following claims.

What is claimed is:

1. Welding machine having a heating plate (21), comprising a frame (1), a heating plate (21), a first workpiece support device (22), a second workpiece support device (23) facing the first workpiece support device (22), first means (24) for moving the heating plate (21) along an insertion travel (39) parallel to its plane between a welding position engaged between the first and second workpiece support devices (22, 23) and a loading position withdrawn from the first and second workpiece support devices (22, 23), second means (25) for moving the heating plate (21) along a welding travel (29) perpendicular to its plane between two extreme positions, and third means (26), different from the second means (25), for moving the second workpiece support device (23) along a contact travel (129) perpendicular to the plane of the heating plate (21) toward and away from the first workpiece support device (22) and between two respective bearing and withdrawn positions, together with means for moving the first workpiece support device (22) perpendicular to the heating plate (21) toward or away from the second workpiece support device (23), the first workpiece support device (22) further comprising:

an adjustable position table (50) mounted on the frame (1), the table (50) being movable toward or away from the second workpiece support device (23), and means (150–155) for locking the table (50) in a particular position chosen from a set of predefined positions and to withstand pressure forces exerted on the table (50) during operation of the machine.

2. A welding machine as claimed in claim 1, wherein the means (150–155) for locking the table (50) comprise transverse screws (150, 151) selectively engaged in corresponding holes in respective lateral guide plates (152, 153) fixed to the frame (1) and in guide brackets (154, 155) carried by the table (50).

3. A welding machine as claimed in claim 1 further comprising indexing means (27) for indexing the welding travel (29) of the heating plate (21) by movement of its two extreme positions of welding travel (29) perpendicular to the plane of the heating plate (21) toward or away from the first workpiece support device (22).

4. A welding machine as claimed in claim 3, wherein the table (50) comprises a top plate (51) joined to a bottom support (52) by expandable connecting members each including a first arm (53), one end (54) of which is articulated to the bottom support (52) and the other end (55) of which slides under the top plate (51), and a second arm (56), one end (57) of which is articulated under the top plate (51) and the other end (58) of which slides on the bottom support (52), the two arms (53, 56) being articulated to each other in their central areas (59), the sliding end (58) of the second arm (56) being slid horizontally on the bottom support (52) by a cylinder (60) to adjust the height of the table (50).

5. A welding machine as claimed in claim 1, wherein the heating plate (21) is mounted on a mobile heating plate support bracket (28) movable in translation along said welding travel (29) perpendicular to the plane of the heating plate (21) on a frame (32) itself carried by a heating plate support carriage (33), the heating plate support carriage (33) being itself movable along said insertion travel (39) parallel to the plane of the heating plate (21) on first guides (15, 16) attached to the frame (1), indexing means (27) for indexing the welding travel (29) of the heating plate (21) comprising means for selectively fixing the heating plate support frame (32) on the heating plate support carriage (33) in a plurality of positions offset from each other in the direction perpendicular to the heating plate (21).

6. A welding machine according to claim 5 wherein the heating plate (21) is oriented in a substantially horizontal position, its insertion travel (39) is substantially horizontal and its welding travel (29) is substantially vertical, the first workpiece support device (22) is in a lower position on the frame (1) and the second workpiece support device (23) is in an upper position on the frame (1) and its contact travel (129) is substantially vertical.

7. A welding machine as claimed in claim 6 wherein:

the heating plate support carriage (33) comprises at least two vertical lateral flanges (37, 38) each having an indexing opening (42) with a vertical linear main part (43), one end (44) of which is joined to a plurality of oblique secondary parts (45–48) diverging from each other in the downward direction and offset from each other in the vertical direction, the heating plate support frame (32) comprises transverse horizontal lugs or rods (49) engaging in the indexing openings (42) of the heating plate support carriage (33), and able to slide in said indexing openings (42) to penetrate selectively into one of the oblique secondary parts (45–48) and to abut against its bottom.

8. A welding machine as claimed in claim 6, wherein the heating plate support carriage (33) is moved along its insertion travel by two horizontal cylinders (40, 41) in the upper part of the frame (1) on respective opposite sides of the interior part (2) of the frame (1).

9. A welding machine as claimed in claim 5, wherein the mobile heating plate support bracket (28) slides on guides (30, 31) of the frame (32) and is moved along its welding travel (29) by a cylinder (42) carried by the frame (32).

10. A welding machine as claimed in claim 1, wherein the frame (1) comprises a door (20) with two telescopic lateral flaps (61, 62; 63, 64).

11. A welding machine as claimed in claim 1, wherein:

in the extreme position of the welding travel of the heating plate (21) in which the first heating block is pressed against the connecting face of the first workpiece to be welded fixed to the first workpiece support device (22), the heating plate (21) is in bearing engagement with abutments carried by the tooling of the first workpiece support device (22), and in the bearing engagement position of the second workpiece support device (23), in which the connecting face of the second workpiece to be welded is pressed against the top face of the second heating block of the heating plate (21), abutments carried by the tool of the second workpiece support device (23) are in bearing engagement with the heating plate (21).

* * * * *